United States Patent [19]
Catherwood et al.

[11] Patent Number: 5,535,376
[45] Date of Patent: Jul. 9, 1996

[54] DATA PROCESSOR HAVING A TIMER CIRCUIT FOR PERFORMING A BUFFERED PULSE WIDTH MODULATION FUNCTION AND METHOD THEREFOR

[75] Inventors: Michael I. Catherwood, Austin, Tex.; Kevin Kilbane, Costa Mesa, Calif.; Laura M. Dobbs, Austin, Tex.

[73] Assignee: Motorola, Inc., Schaumburg, Ill.

[21] Appl. No.: 62,625

[22] Filed: May 18, 1993

[51] Int. Cl.⁶ .................................................. G06F 1/04
[52] U.S. Cl. ................................................................ 395/550
[58] Field of Search ...................................... 395/250, 550

[56] References Cited

U.S. PATENT DOCUMENTS

| | | | |
|---|---|---|---|
| 4,222,103 | 9/1980 | Chamberlin | 364/200 |
| 4,618,968 | 10/1986 | Sibigtroth | 377/39 |
| 4,910,671 | 3/1990 | Kitamura et al. | 395/184.01 |
| 4,926,319 | 5/1990 | Wilkie et al. | 364/200 |
| 4,942,522 | 7/1990 | Wilkie et al. | 364/200 |
| 5,436,853 | 7/1995 | Shimohara | 364/569 |

OTHER PUBLICATIONS

"M68300 Family TPU Time Processor Unit Reference Manual", published by Motorola, Inc., in 1990, pp. 3-34 to 3-56.

"M68HC11 Reference Manual" published by Motorola, Inc. in 1989, pp. 10-34, 10-36, and 10-21.

*Primary Examiner*—Krisna Lim
*Assistant Examiner*—Kenneth R. Coulter
*Attorney, Agent, or Firm*—Elizabeth A. Apperley

[57] ABSTRACT

A timer (28) uses two output-compare timer channels to form a buffered pulse width modulator. A first register (62) and a second register are provided to store a first pulse width value and a second register (66), respectively. When the first register (62) is written to, a select control circuit (68) provides the first pulse width value stored therein to a channel input/output circuit (70). When the second register (66) is written to, the select control circuit (68) provides the second pulse width value stored therein to the channel input/output circuit (70). The select control circuit (68) provides one of the first and second pulse width values such that the signal output by the channel input/output circuit (70) is not erroneous. By writing a new pulse width value to a register associated with an unused channel, the pulse width modulation function is buffered.

15 Claims, 4 Drawing Sheets

5,535,376

DATA PROCESSOR HAVING A TIMER CIRCUIT FOR PERFORMING A BUFFERED PULSE WIDTH MODULATION FUNCTION AND METHOD THEREFOR

FIELD OF THE INVENTION

This invention relates generally to a data processor, and more particularly to a pulse width modulator circuit in a data processor.

BACKGROUND OF THE INVENTION

Timers are well known and widely used in the data processing field. In general, timers have timer channels which are dedicated to performing input capture or output compare functions. During an input capture function, a timer may be used to capture the time at which an external event occurs. Conversely, during an output compare function, the timer may be used to generate an output signal at programmable intervals. Both the input capture function and the output compare function may be used to generate interrupts in the data processing system.

Timers may also be used to perform a pulse width modulation function. During the pulse width modulation function, a pulse having a preselected width is asserted during a period of time. The preselected width is generally determined by a user of the timer and is represented by a pulse value stored in a first timer channel register used solely for the purpose of performing the pulse width modulation function. Additionally, a second timer channel register is typically required to store a period value in a second timer channel register to indicate the period of time in which the pulse having the preselected width is asserted. Therefore, at least two registers are required to store the pulse value and the period value needed to perform the pulse width modulation function.

In most timers, dedicated circuitry is provided for performing the pulse width modulation function. The dedicated circuitry generally includes a third register for storing a value of the preselected width of the pulse. The contents of the third register are provided to the timer channel register at an appropriate point in time such that no glitches occur even when the width of the pulse is modified. The dedicated circuitry insures that pulses have the preselected width are output without glitches even when the width of the pulse is modified to be either shorter or longer. However, such circuitry requires at least three registers in addition to the control circuitry required to control each of the registers during execution of the pulse width modulation function. A first one of the three registers is required to store a current pulse width value and a second one of the three registers is required to store a period value to indicate the period of time in which the pulse is to be asserted. The third one of the three registers is required to store a next pulse width value which is to be used during the pulse width modulation function. While the use of the three registers insures that no glitches occur and no erroneous pulses are generated, this solution is hardware intensive and may not be possible to implement in data processing systems which emphasize low cost solutions to data processing challenges.

An alternative to the dedicated circuitry for performing the pulse width modulation function is the use of an output compare channel to generate output pulses having the preselected width of the pulse. However, when this alternative approach is used, the output pulses are unbuffered. Because the output pulses are unbuffered, an asynchronous modification of the width of the pulse may result in glitches and an erroneous output. Therefore, a user of a system must allow for such glitches to be output in a data processing system which uses an output compare channel to perform a pulse width modulation function.

Therefore, to implement the pulse width modulation function, a user must choose between costly circuit area intensive designs and less expensive alternatives which generate erroneous outputs when a width of an output pulse is modified.

SUMMARY OF THE INVENTION

The previously mentioned needs are fulfilled with the present invention. Accordingly, there is provided, in a first form, a timer which includes a first output channel and a second output channel. The timer also includes a counter for generating a count value and a first storage means for storing a first pulse width value. A first comparator is provided for comparing the count value with the first pulse width value. The first comparator asserts a first comparison signal when the count value is the same as the first pulse width value. The first comparator has a first input coupled to the counter for receiving the count value and a second input coupled to the first storage means for receiving the first pulse width value. The timer also includes a second storage means for storing a second pulse width value. A second comparator is provided for comparing the count value with the second pulse width value. The second comparator asserts a second comparison signal when the count value is the same as the second pulse width value. The second comparator has a first input coupled to the counter for receiving the count value and a second input coupled to the second storage means for receiving the first pulse width value. A select circuit is provided for selecting one of the first comparison signal and the second comparison signal as an output pulse width value. The select circuit has a first input coupled to the first comparator for receiving the first comparison value and a second input coupled to the second comparator for receiving the second comparison value. The timer also includes an output circuit for providing a pulse having an output pulse width determined by the output pulse width value. The output circuit is connected to the select circuit for receiving the output pulse value.

These and other features, and advantages, will be more clearly understood from the following detailed description taken in conjunction with the accompanying drawings. It is important to note the drawings are not intended to represent the only form of the invention.

DETAILED DESCRIPTION OF A PREFERRED EMBODIMENT

The present invention provides a timer circuit in a data processing system which performs a buffered pulse width modulation function without glitches and without requiring dedicated circuitry. In the timer circuit described herein, the buffered pulse width modulation function is performed using two output compare channels of the timer. During the pulse width modulation function, a first integrated circuit pin associated with a first output compare channel provides a pulse having a first pulse width. In the embodiment of the invention described herein, the first pulse width is stored in a first register circuit which corresponds to the first output compare channel. When a user of the data processing system requires a second pulse width, a value specifying the second pulse width is stored in a second register circuit. The second register circuit is in a second output compare channel. At that point, a control signal is provided which indicates that the second pulse width has been written to the second register circuit. After the control signal is provided and when the end of a timing period occurs, the first output compare channel is enabled to provide a pulse which has the second pulse width at a next period in time. A second integrated circuit pin associated with the second output compare channel is typically used as a general purpose input/output pin. The timer circuit and a corresponding method of operation are subsequently explained in more detail.

The embodiment of the invention as will be described herein provides an efficient method for performing a buffered pulse width modulation function in the data processing system. The buffered pulse width modulation function is provided with the addition of a minor amount of circuitry. Therefore, the timer has greater functionality without the overhead of the dedicated circuitry typically associated with performing the unbuffered pulse width modulator function.

During a following description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state.

Figure 1:
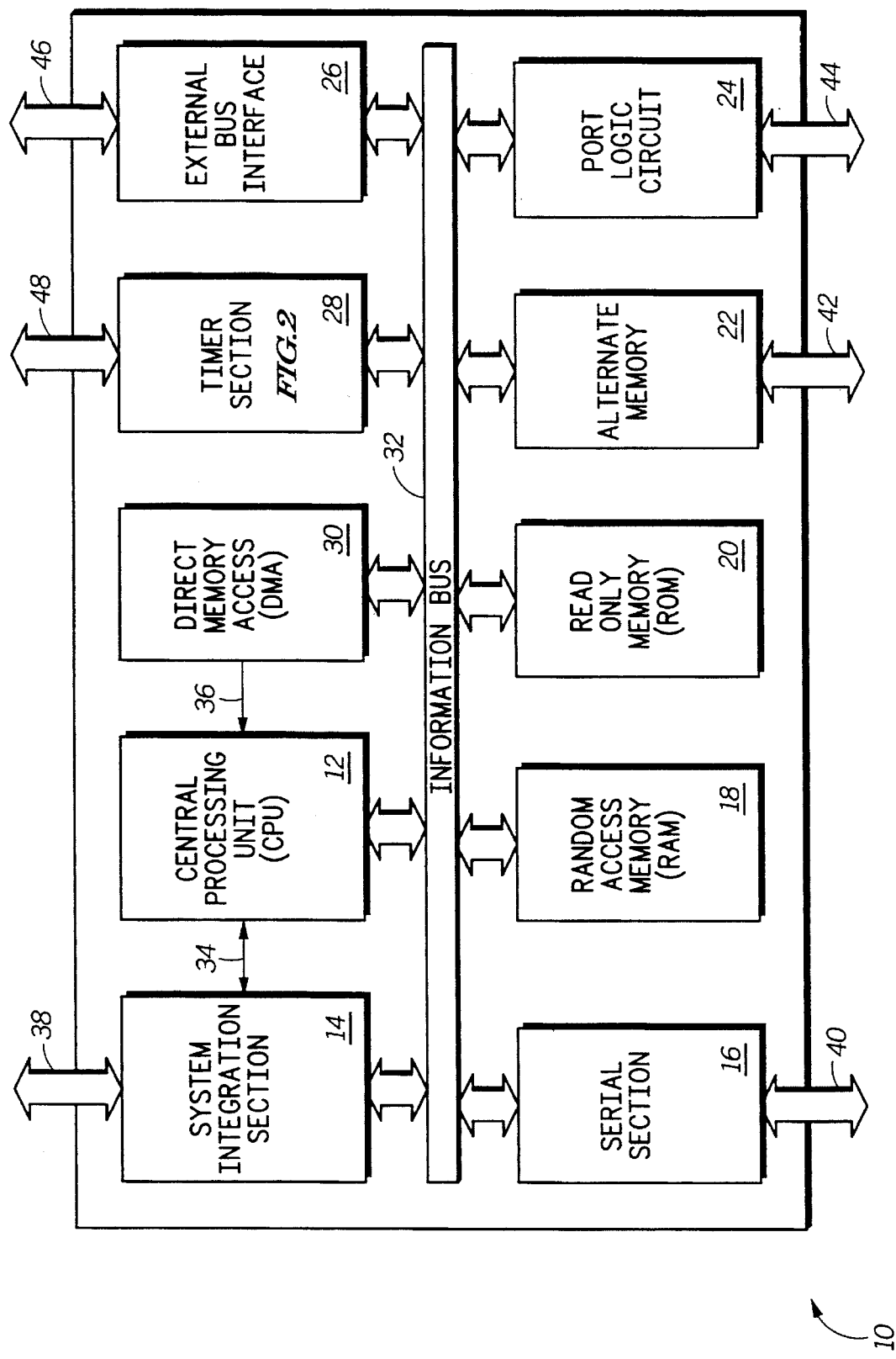
FIG. 1 illustrates in block diagram form a data processing system having a timer which performs a pulse width modulation function.

FIG. 1 illustrates one embodiment of a data processing system 10. Data processing system circuitry 10 generally includes a central processing unit (CPU) circuit 12, a system integration section of circuitry 14, a serial section of circuitry 16, random access memory (RAM) circuit 18, a read only memory (ROM) circuit 20, an alternate memory circuit 22 (e.g. electrically erasable programmable read only memory, EEPROM), a port logic circuit 24, an external bus interface circuit 26, a timer section of circuitry 28, and a direct memory access (DMA) circuit 30. Each of CPU 12, a system integration circuit 14, serial circuit 16, RAM 18, ROM 20, alternate memory circuit 22, port logic circuit 24, external bus interface circuit 26, timer circuit 28, and DMA 30 is bi-directionally coupled to an Information Bus 32. CPU 12 and system integration section 14 are bi-directionally coupled via a bus 34. Similarly, CPU 12 is coupled to DMA 30 via a bus 36.

System integration section 14 can receive and transmit signals external to data processing system 10 by way of a plurality of integrated circuit pins 38. The plurality of integrated circuit pins are not shown in detail herein. Serial section 16 can receive and transmit signals external to data processing system 10 by way of a plurality of integrated circuit pins 40. Again, the plurality of integrated circuit pins are not shown in detail herein. Depending upon the type of memory, alternate memory circuit 22 may optionally receive and transmit signals external to data processing system 10 by way of a plurality of integrated circuit pins 42 (not shown in detail herein). Port logic circuit 24 can also receive and transmit signals external to data processing system 10 by way of a plurality of integrated circuit pins 44. Additionally, external bus interface 26 can receive and transmit signals external to data processing system 10 by way of a plurality of integrated circuit pins 46. Timer section 28 can also receive and transmit signals external to data processing system 10 by way of a plurality of integrated circuit pins 48.

FIG. 1 illustrates one possible microcontroller within a family of microcontrollers. Because microcontrollers in the same family of data processors generally have a plurality of differing on-board peripherals, data processing system 10 provides only one embodiment of the invention described herein. For example, other embodiments of data processing system 10 may not have ROM 20, external bus interface 26, or DMA 30. Additionally, other co-processors may also be implemented in data processing system 10. In fact, other embodiments of data processing system 10 may have fewer, more, or different peripherals than those illustrated in FIG. 1. Additionally, in the embodiment of the invention illustrated in FIG. 1, data processing system 10 is an eight bit microcontroller which includes sixteen bit addresses and both eight bit and sixteen bit storage registers.

During operation of the embodiment of the invention illustrated in FIG. 1, system integration section 14 is used as a general controller for data processing system 10. Generally, system integration section 14 provides a plurality of control information to both enable and disable operation, to provide timing control and clock generation, and to perform exception handling requirements for data processing system 10. System integration section 14 may interface directly with central processing unit 12 via bus 34, an external user via the plurality of integrated circuit pins 38, and with each of a remaining plurality of components of data processing system 10 via Information bus 32.

In data processing system 10, DMA 30 allows direct communication of data between memory internal to data processing system 10 and a plurality of peripheral devices (not shown). DMA 30 may be optionally implemented on data processing system 10 when a user requires a fast memory access method. Use and implementation of direct memory access circuits are well known in the data processing art and will not be discussed in further detail.

External bus interface 26 controls receipt and transmission of address and data values between an external user or external peripheral device and data processing system 10. External bus interface 26 communicates a plurality of address and data values to a remaining portion of data processing system 10 via Information bus 32.

Port logic circuit 24 controls operation and functionality of each one of the plurality of integrated circuit pins 44. Port logic circuit 24 configures the plurality of integrated circuit pins 44 to function either as general purpose input/output pins in a first mode of operation. In a second mode of operation, port logic circuit 24 may use each of the plurality of integrated circuit pins 44 to communicate multiplexed address and data information.

RAM 18, ROM 20, and alternate memory 22 function to store information necessary for the proper operation of data processing system 10. Additionally, other data and address values may be stored therein if specified in a user program.

Serial section 16 communicates serial digital data between data processing system 10 and an external user or an external peripheral device. The serial digital data and appropriate control signals are communicated via the plurality of integrated circuit pins 40.

CPU 12 controls execution of a plurality of instructions during operation of data processing system 10. Implementation and use of a central processing unit are well known in the data processing art and will be discussed in further detail.

Timer section 28 executes a plurality of timing functions which are based on a timer counter which may be enabled to operate as a free-running counter or a modulo counter. When enabled through Information Bus 32, timer section 28 may function to perform an input-capture function, an output-compare function, an unbuffered pulse modulation function, or a buffered pulse width modulation function. In addition to the data provided via Information Bus 32, the plurality of integrated circuit pins 48 also provide an input clock, inputs for external signals, or outputs for signals for timer section 28. Operation of timer section 28 will be subsequently discussed in more detail.

Figure 2:
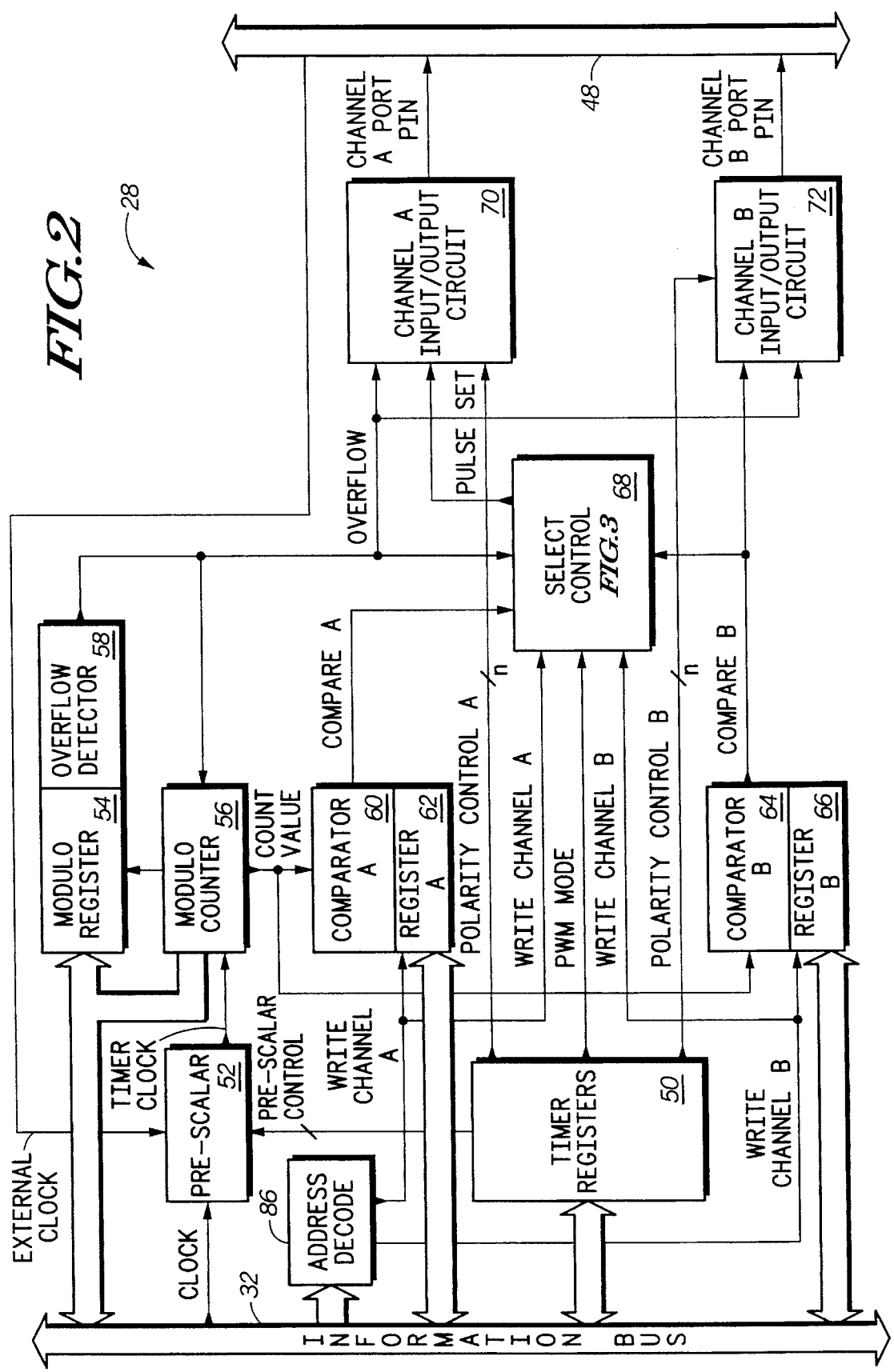
FIG. 2 illustrates in block diagram form a portion of the timer which performs the pulse width modulation function in accordance with the present invention.

A portion of timer section 28 is illustrated in more detail in FIG. 2. The portion of timer section 28 illustrated in FIG. 2 generally includes a plurality of timer registers 50, a pre-scalar circuit 52, a modulo register 54, a modulo counter 56, an overflow detector 58, a comparator A 60, a register A 62, a comparator B 64, a register B 66, a select control circuit 68, a channel A input/output circuit 70, a channel B input/output circuit 72, and an address decoder 86.

Information Bus 32 is coupled to the plurality of timer registers 50 to communicate data necessary to perform timing functions in timer section 28. Information Bus 32 is also connected to modulo register 54 to provide a modulo value, to address decoder 86 to provide address values, and to modulo counter 56 to receive a current count value generated by modulo counter 56. Furthermore, Information Bus 32 is bidirectionally coupled to both register A 62 and the register B 66. Information Bus 32 is also connected to pre-scalar circuit 52 to provide a Clock signal. Additionally, the plurality of integrated circuit pins 48 provides an External Clock signal to pre-scalar circuit 52.

Address decoder 86 is connected to both register A 62 and register B 66 to provide a Write Channel A signal and a Write Channel B signal, respectively. Address decoder 86 provides both the Write Channel A signal and the Write Channel B signal to select control circuit 68, as well. Although not shown herein, address decoder 86 is also connected to each of modulo register 54, modulo counter 56, and the plurality of timer registers 50 to provide decoded address information. Routing of such information is well known in the data processing art and is, therefore, not illustrated in FIG. 2.

Modulo register 54 is connected to an output of modulo counter 56. Modulo register 54 is also coupled to overflow detector 58. Overflow detector 58 is connected to both channel A input/output circuit 70 and select control circuit 68 to provide an Overflow signal. Overflow detector 58 is also connected to modulo counter 56 and to channel B input/output circuit 72 to provide the Overflow signal.

Pre-scalar circuit 52 is connected to an input of modulo counter 56 to provide a signal labeled "Timer Clock". Modulo counter 56 is connected to both comparator A 60 and comparator B 64 to provide a Count Value signal to each.

Comparator A 60 is connected to select control circuit 68 to provide a signal labeled "Compare A". Similarly, comparator B 64 is connected to both select control circuit 68 and channel B input/output circuit 72 to provide a signal labeled "Compare B".

The plurality of timer registers 50 is connected to select control circuit 68 to provide a signal labeled "PWM Mode". The plurality of timer registers 50 is also connected to channel A input/output circuit 70 to provide a plurality of Polarity Control A signals. Similarly, the plurality of timer registers 50 is connected to channel B input/output circuit 72 to provide a plurality of Polarity Control B signals. The plurality of timer registers 50 is also connected to pre-scalar 52 to provide a plurality of Pre-Scalar Control signals.

Channel A input/output circuit 70 provides a signal labeled "Channel A Port Pin". Channel B input/output circuit 72 provides a signal labeled "Channel B Port Pin". Select control circuit 68 is connected to channel A input/output circuit 70 to provide a signal labeled "Pulse Set".

Figure 3:
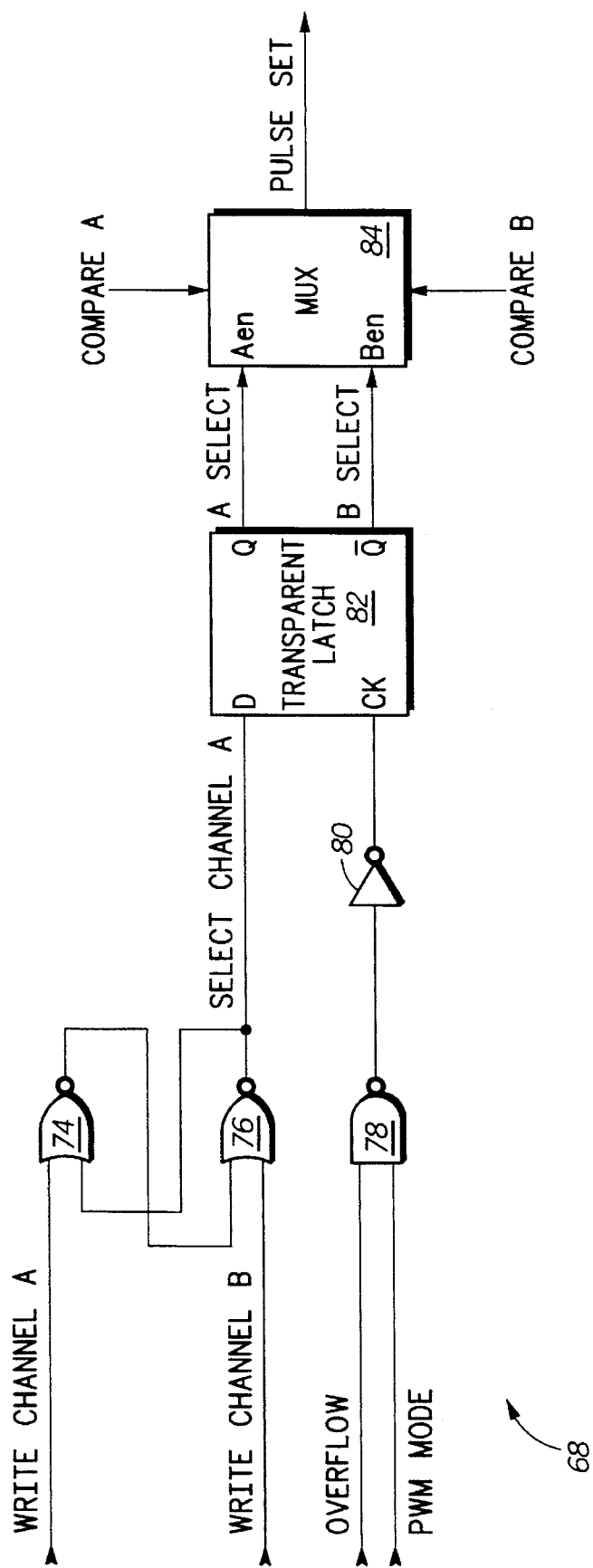
FIG. 3 illustrates in block diagram form a portion of a select control circuit of FIG. 2.

Select control circuit 68 is illustrated in greater detail in FIG. 3. Select control circuit 68 generally includes a NOR gate 74, a NOR gate 76, a NAND gate 78, an inverter 80, a transparent latch 82, and a multiplexor 84.

The Write Channel A signal is provided to a first input of NOR gate 74. An output of NOR gate 74 is provided to a first input of NOR gate 76. The Write Channel B signal is provided to a second input of NOR gate 76. An output of NOR gate 76 is connected to both a second input of NOR gate 74 and a data input of transparent latch 82. The output of NOR gate 76 is a signal labeled "Select Channel A".

The Overflow signal is provided to a first input of NAND gate 78. The PWM Mode signal is provided to a second input of NAND gate 78. An output of NAND gate 78 is connected to an input of inverter 80. An output of inverter 80 is connected to a clock input of transparent latch 82. A first output of transparent latch 82 is connected to an A enable input of multiplexor 84 to provide a signal labeled "A Select". A second output of transparent latch 82 is connected to an B enable input of multiplexor 84 to provide a signal labeled "B Select". The Compare A and Compare B signals are each also input to multiplexor 84. An output of multiplexor 84 is the Pulse Set signal.

During operation of data processing system 10, a user may enable timer section 28 to perform a buffered pulse width modulation function. Timer section 28 uses data values stored in the plurality of timer registers 50 (FIG. 2) to configure each of the Channel A Port Pin and the Channel B Port Pin to perform the pulse width modulation function. For example, a predetermined bit of a first one of the plurality of timer registers 50 is used to determine whether the Channel A Port Pin and the Channel B Port Pin will perform the buffered pulse width modulation function or another function specified by the user of data processing system 10. As was previously mentioned, other functions may include input capture, output compare, and unbuffered pulse width modulation functions. The predetermined bit which specifies a mode of operation of timer section 28 determines a logic state of the PWM Mode signal provided to select control circuit 68 by the plurality of timer registers 50.

The data values stored in the plurality of timer registers 50 may also be used to determine a behavior of the pulse output by both the Channel A Port Pin and the Channel B Port Pin. For example, depending on a plurality of values stored in a second one of the plurality of timer registers 50, the pulse output by either of the Channel A Port Pin and the Channel B Port Pin may be either toggled, negated, or asserted. A first one of the plurality of values stored in the second one of the plurality of timer registers 50 is used to determine a logic state of the Polarity Control A signal provided to channel A input/output circuit 70. Similarly, a second one of the plurality of values stored in the second one of the plurality of timer registers 50 is used to determine a logic state of the Polarity Control B signal provided to channel B input/output circuit 72.

Each of the data values discussed above is provided to the plurality of timer registers 50 via Information Bus 32. A user of data processing system 10 typically programs at least a portion of the plurality of timer registers 50 such that timer section 28 performs a preselected function.

In addition to configuring timer section 28 to perform the pulse width modulation function and selecting a polarity of the signal output during execution of the pulse width modulation function, a user must also provide a pulse width value specifying a width of a pulse being generated. The pulse width value may be stored in either register A 62 or register B 66 and is transferred via Information Bus 32. When the pulse width value should be stored in register A 62, the Information Bus 32 provides an address value corresponding to register A 62 to address decoder 86. Address decoder 86 subsequently decodes the address value and provides the Write Channel A signal to indicate that the pulse width value has been written to register A 62. Similarly, when the pulse width value should be stored in register B 66, the Information Bus 32 provides an address value corresponding to register B 66 to address decoder 86. Address decoder 86 subsequently decodes the address value and provides the Write Channel B signal to indicate that the pulse width value has been written to register A 62. In general, during operation of timer section 28, address decoder 86 decodes address information provided by Information Bus 32 to identify each of the elements which are included in timer section 28.

In addition to the width of the pulse being generated, the user of data processing system 10 must also program a period of the pulse. The period of the pulse is determined by a value stored in modulo register 54. Operation of modulo counter 56 during execution of the pulse width modulation function will be subsequently be discussed in further detail.

When the pulse width value has been provided to one of register A 62 or register B 66, the pulse period has been stored as the modulo value in modulo register 54, and the PWM Mode signal is asserted, the portion of timer section 28 illustrated in FIG. 2 may be used to perform a buffered pulse width modulation function.

During execution of the pulse width modulation function, only the Channel A Port Pin is enabled to output a buffered pulse. If the pulse width value is stored in register A 62, select control circuit 68 provides the Compare A signal as the Pulse Set signal to channel A input/output circuit 70 when the Overflow signal is asserted. The Compare A signal is asserted when the pulse width value stored in register A 62 is the same as the Count Value signal provided by modulo counter 56. Additionally, the Pulse Set signal is also asserted. The Compare A signal is subsequently used to determine a width of the pulse output by channel A input/output circuit 70. If the pulse width value is stored in register B 66, select control circuit 68 provides the Compare B signal as the Pulse Set signal to channel A input/output circuit 70 when the Overflow signal is asserted. The Compare B signal is asserted when the pulse width value stored in register B 66 is the same as the Count Value signal provided by modulo counter 56. Additionally, the Pulse Set signal is also asserted. The Compare B signal is, therefore, used to determine the width of the pulse output by channel A input/output circuit 70. The Channel B Port Pin acts as a general purpose input/output pin and is not used during execution of the pulse width modulation function.

During operation, Information Bus 32 provides a Clock signal to pre-scalar 52. Additionally, the plurality of integrated circuit pins 48 also provides the External Clock signal to pre-scalar 52. Pre-scalar 52 selects either the Clock signal or the External Clock signal to generate a system clock, the Timer Clock signal, in response to the Pre-Scalar Control signals provided by the plurality of timer registers 50. Assume in the example described herein that pre-scalar 52 scales the Clock signal to provide a timer system clock at one of a plurality of selectable frequency rates. The timer system clock is provided to increment modulo counter 56. The Count Value signal output by modulo counter 56 indicates a current count value.

When the current count value is equal to the modulo value stored in modulo register 54, overflow detector 58 asserts the Overflow signal. Modulo counter 56 subsequently begins counting from an initial state after the current count value is equal to the modulo value and the Overflow signal is asserted. Because the modulo value is set prior to execution of the pulse width modulation function, assertion of the Overflow signal may be used to indicate a start of the period of the pulse. For example, in the embodiment of the invention described herein, when the Overflow signal is asserted, channel A input/output circuit 70 asserts a signal output by the Channel A Port Pin. After the Overflow signal is asserted and provided to modulo counter 56, modulo counter 56 is reset to an initial value at a next transition of the Timer Clock signal and begins counting again.

As an example of the buffered pulse width modulation function, assume a user writes a first pulse width value to register A 62. The pulse width value is transferred via Information Bus 32 to register A 62 and the Write Channel A signal is also asserted. When the Overflow signal is asserted again, the Compare A signal is provided as the Pulse Set signal. Modulo counter 56 provides the Count Value signal to comparator A 60 to determine if the count value is equal to the first pulse width value. When the count value is equal to the first pulse width value, comparator A 60 asserts the Compare A signal. Otherwise, the Compare A signal remains negated.

The Compare A signal is provided to select control circuit 68. Additionally, the Write Channel A signal, the Write Channel B signal, the Compare B signal, and the PWM Mode signal are provided to select control circuit 68. The PWM Mode signal is asserted to indicate that timer section 28 is executing the buffered pulse width modulation function.

As illustrated in FIG. 3, the Write Channel A and the Write Channel B signals are respectively provided to NOR gates 74 and 76. It should be noted that NOR gates 74 and 76 form a Set-Reset (S-R) latch. When the Write Channel A signal is asserted and the Write Channel B signal is negated, the Select Channel A signal is asserted. The Select Channel A signal is provided to a data (D) input of transparent latch 82. When the Overflow signal and the PWM signal are both asserted, an output of NAND gate 78 is negated. An output of inverter 80 is subsequently asserted and provided to a clock (CK) input of transparent latch 82. The output of inverter 80 clocks the Select Channel A signal to a first output (Q) and a second output ($\overline{Q}$) of transparent latch 82. The first output provides the A Select signal to the Aen (Channel A enable) input of multiplexor 84. The second output inverts the A Select signal and provides the inverted signal to the Ben (Channel B enable) input of multiplexor 84. Because the A Select signal and, therefore, the Aen input of multiplexor 84 is asserted, multiplexor 84 is enabled to provide the Compare A signal as the Pulse Set signal.

The Pulse Set signal is provided to channel A input/output circuit 70. When the Pulse Set signal is asserted, channel A input/output circuit 70 negates the signal output by the Channel A Port Pin. The Polarity Control A signal is used to determine a polarity of the signal output by the Channel A Port Pin during execution of the buffered pulse width modulation function.

The signal output by the Channel A Port Pin during execution of the buffered pulse width modulation function remains negated until the Overflow signal is asserted. At that point, the signal output by the Channel A Port Pin is also asserted.

The pulse width of the signal output by the Channel A Port Pin will be determined by the value stored in register A 62 until a new value is stored in either register A 62 or register B 66. If the new value is stored in register A 62, a glitch may occur on the signal output by the Channel A Port Pin if the data is written to register A 62 at an erroneous point in time. However, the embodiment of the invention described herein allows a user to program a new value into register B 66, the register which corresponds to the Channel B Port Pin during most timer operations.

The new value is reflected in the pulse width of the signal output by the Channel A Port Pin at a point in time which is synchronous to the Timer Clock signal and which will not result in erroneous information or glitches.

When the user determines that a new pulse width is desired, a new pulse width value is stored in register B 66 and the Write Channel B signal is asserted. The new pulse width value is transferred to register B 66 via Information Bus 32.

Modulo counter 56 provides the Count Value signal to comparator B 64 to determine if the count value is equal to the new pulse width value. When the count value is equal to the new pulse width value, comparator B 64 asserts the Compare B signal. Otherwise, the Compare B signal remains negated.

The Compare B signal is provided to select control circuit 68. As illustrated in FIG. 3, the Write Channel A and the Write Channel B signals are respectively provided to NOR gates 74 and 76. When the Write Channel B signal is asserted and the Write Channel A signal is negated, the Select Channel A signal is negated. The Select Channel A signal is provided to the data (D) input of transparent register 82. When the Overflow signal and the PWM signal are both asserted, the output of NAND gate 78 is negated. The output of inverter 80 is subsequently asserted and provided to the clock (CK) input of transparent latch 82. The output of inverter 80 clocks the Select Channel A signal to the first output (Q) and the second output ($\overline{Q}$) of transparent latch 82. Again, the first output provides the A Select signal to the Aen (Channel A enable) input of multiplexor 84. The second output inverts the A Select signal and provides the inverted signal to the Ben (Channel B enable) input of multiplexor 84. Because the A Select signal is negated, the Ben input of multiplexor 84 is asserted. Therefore, multiplexor 84 is enabled to provide the Compare B signal as the Pulse Set signal.

The Pulse Set signal is provided to channel A input/output circuit 70. When the Pulse Set signal is asserted, channel A input/output circuit 70 negates the signal output by the Channel A Port Pin. The Polarity Control A signal is used to determine a polarity of the signal output by the Channel A Port Pin during execution of the buffered pulse width modulation function.

The signal output by the Channel A Port Pin during execution of the buffered pulse width modulation function remains negated until the Overflow signal is asserted. At that point, the signal output by the Channel A Port Pin is also asserted. While the buffered pulse width modulation function is performed, the Channel B Port Pin performs general input/output functions which are well known in the data processing art and will not be discussed in further detail.

Figure 4:
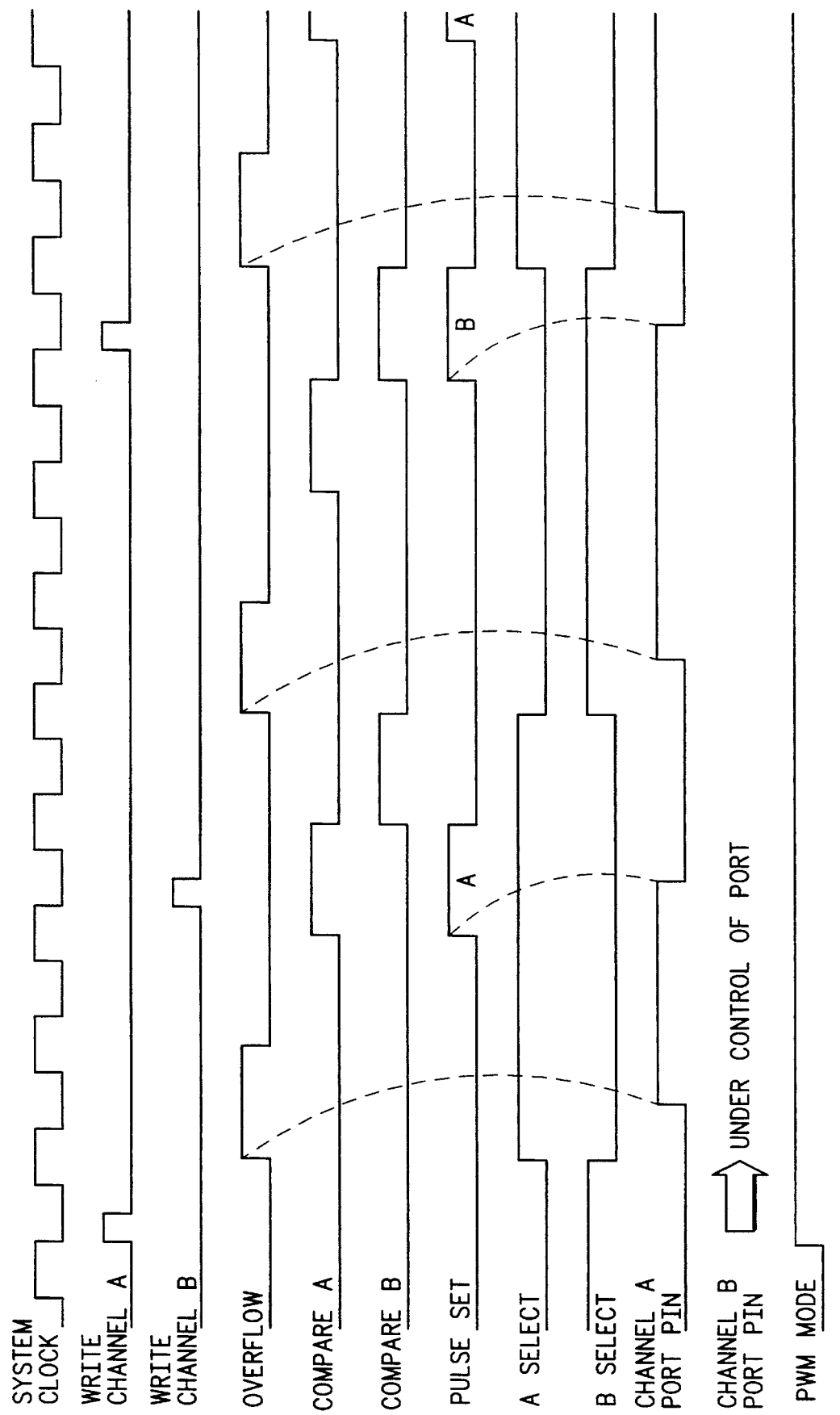
FIG. 4 illustrates in timing diagram form execution of the pulse width modulation function in accordance with the present invention.

FIG. 4 provides a timing diagram which summarizes the examples provided above. The Timer Clock signal is provided at the top of FIG. 4 and the PWM Mode signal is provided at the bottom of FIG. 4. The PWM Mode signal is asserted to indicate that the data processing system is executing the buffered pulse width modulation function. The Write Channel A signal is asserted when a user writes a first pulse width value to register A 62 (FIG. 2). The Overflow signal is then asserted because the modulo value stored in modulo register 54 is equal to the current value of modulo counter 56. When the Overflow signal is asserted, transparent latch 82 asserts the A Select output and negates the B Select output. Additionally, when the Overflow signal is asserted, an output of the Channel A Port Pin is asserted. The output of the Channel A Port Pin remains asserted until the current value of modulo counter 56 is equal to the first pulse width value stored in register A 62. At that point, both the Compare A signal and the Pulse Set signals are asserted. The signal output by the Channel A Port Pin is subsequently negated until the Overflow signal is asserted.

Next, the Write Channel B signal is asserted when a user writes a second pulse width value to register B 66. Again, the Overflow signal is asserted and, therefore, the signal provided by the Channel A Port Pin is asserted. Transparent latch 82 negates the A Select output and asserts the B Select output in response to both the Write Channel B signal being asserted and the Overflow signal being asserted.

The output of the Channel A Port Pin remains asserted until the current value of modulo counter 56 is equal to the first pulse width value stored in register B 66. At that point, both the Compare B signal and the Pulse Set signals are asserted. The signal output by the Channel A Port Pin is subsequently negated until the Overflow signal is asserted.

Notice, the Compare B signal was asserted after the Write Channel B signal is asserted, but before the Overflow signal is asserted. In such a situation, the signal output by the Channel A Port Pin is not changed by the value the Compare B signal. Additionally, notice that the signal output by the Channel B Port Pin is determined in response to general purpose input and output functions.

The data processing system provided herein executes buffered pulse width modulation functions efficiently with little added circuitry. The Channel A Port Pin and the Channel B Port Pin separately function as input capture or output compare channels of timer section 28. However, when the user programs timer section 28 to perform a buffered pulse width modulation function, the Channel A Port Pin and the Channel B Port Pin are linked together to provide a buffered pulse width signal. The buffered pulse width signal is output on the Channel A Port Pin while the Channel B Port Pin performs general purpose input and output functions.

In the embodiment of the invention described herein, both register A 62 and register B 66 are provided to store pulse width values. When a first one of the registers (62 and 66) is written to, select control circuit 68 provides the first pulse width value stored therein to channel A input/output circuit 70 as the Pulse Set signal. Subsequently, when a second one of the registers (62 and 66) is written to, select control circuit 68 again provides the second pulse width value stored therein to channel A input/output circuit 70. Select control circuit 68 insures that the Pulse Set signal provides one of the Compare A signals and the Compare B signals such that the signal output by the Channel A Port Pin is not erroneous. By writing a new pulse width value to a register associated with an unused channel, the pulse width modulation function is buffered.

As was previously mentioned, timer section 28 may also implement input capture, output compare, and unbuffered pulse width modulation functions. Each of these functions is well known in the data processing art and will not be discussed in further detail. It should be noted that the unbuffered pulse width modulation function is simply an output compare function which uses an overflow value to provide a timing period for the signal output by the timer section 28. Additionally, when channel A input/output circuit 70 and channel B input/output circuit are not configured to perform the buffered pulse width modulation function, each of channel A input/output circuit 70 and channel B input/output circuit 72 may perform any of the input capture, output compare, and unbuffered pulse width modulation functions concurrently and independently with respect to one another.

The implementation of the invention described herein is provided by way of example only. However, many other implementations may exist for executing the function described herein. For example, more channels may be configured to execute any number of buffered pulse width modulation functions. Additionally, both channel A input/output circuit 70 and channel B input/output circuit 72 may be implemented using combinatorial logic. The combinatorial logic used to implement each of A input/output circuit 70 and channel B input/output circuit 72 is determined by a designer of the data processing system.

Additionally, the signals output on the Channel A Port Pin and the Channel B Port Pin may be programmed to reflect more than a choice of polarity as is reflected in this disclosure of the invention. Additionally features may be added to enhance the functionality of the timer system described herein.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A timer in a data processor, comprising:

decode means for selectively generating a first write channel signal and a second write channel signal;

a counter for generating a count value;

a first storage means for selectively storing a first pulse width value when the first write channel signal is a first value, the first storage means being coupled to the decode means for receiving the first write channel signal;

a first comparator for comparing the count value with the first pulse width value, the first comparator asserting a first comparison signal when the count value is the same as the first pulse width value, the first comparator having a first input coupled to the counter for receiving the count value, the first comparator having a second input coupled to the first storage means for receiving the first pulse width value;

a second storage means for selectively storing a second pulse width value when the second write channel signal is a second value, the second storage means being coupled to the decode means for receiving the second write channel signal;

a second comparator for comparing the count value with the second pulse width value, the second comparator asserting a second comparison signal when the count value is the same as the second pulse width value, the second comparator having a first input coupled to the counter for receiving the count value, the second comparator having a second input coupled to the second storage means for receiving the second pulse width value;

a select circuit for selecting an output pulse width value, the select signal selecting the first comparison signal as the output pulse width value when the first write channel signal is the first logic value and the select signal selecting the second comparison signal as the output pulse width value when the second write channel signal is the second logic value, the select circuit having a first input coupled to the first comparator for receiving the first comparison value, a second input coupled to the second comparator for receiving the second comparison value, a third input coupled to the decode means for receiving the first write channel signal, and a fourth input coupled to the decode means for receiving the second write channel signal; and an output circuit for providing a pulse having an output pulse width determined by the output pulse width value, the output circuit being coupled to the select circuit for receiving the output pulse value.

2. The timer of claim 1 wherein the first write channel signal is the first logic value when the first pulse width value is stored in the first storage means and the second write channel signal is the second logic value when the second pulse width value is stored in the second storage means.

3. The timer of claim 1 further comprising:

a counter register for storing a modulo value, the counter register being coupled to the counter for providing the modulo value; and a detector circuit for detecting when the count value generated by the counter is the same as the modulo value stored in the counter register, the detector circuit having a first input coupled to the modulo counter for receiving the count value, the detector circuit having a second input coupled to the count register for receiving the modulo value.

4. The timer of claim 3 wherein the detector circuit asserts an overflow signal to indicate that the count value is the same as the modulo value.

5. The timer of claim 3 wherein the modulo value indicates a period of the pulse output by the output circuit.

6. The timer of claim 1 wherein the select circuit provides the output pulse width value in response to both the first logic state of the first write channel signal and the second logic state of the second write channel signal.

7. The timer of claim I further comprising:

a timing register for storing a first value which selectively enables the timer circuit to perform a buffered pulse width modulation function.

8. The timer of claim 7 wherein the timing register stores a second value which determines a polarity of the pulse provided by the output circuit.

9. A method for executing a buffered pulse width modulation function in a data processor, comprising the steps of:

decoding an address value to selectively generate one of a first write channel signal and a second write channel signal enabling a counter to generate a counter value;

storing a modulo value in a modulo register;

storing a first pulse width value in a first register when the first write channel signal is in a first logic state;

storing a second pulse width value in a second register when the second write channel signal is in a second logic state;

asserting a first compare signal when the first pulse width value is the same as the counter value, the first compare signal remaining negated when the first compare value is the value other than the counter value;

asserting a second compare signal when the second pulse width value is the same as the counter value, the second compare signal remaining negated when the second compare value is the value other than the counter value;

asserting an overflow signal when the modulo value is the same as the counter value, the overflow signal remaining negated when the overflow value is the value other than the counter value;

enabling a select control circuit to provide one of the first compare signal and the second compare signal as a pulse set signal, the select control circuit providing the first compare signal as the pulse set signal when the overflow signal is asserted and the first write channel is asserted, the select control circuit providing the second compare signal as the pulse set when the overflow signal is asserted and the second write channel signal is asserted;

enabling an integrated circuit pin associated with the first timer channel to assert an output pulse signal when the overflow signal is asserted; and enabling the integrated circuit pin associated with the first timer channel to negate the output pulse signal when the pulse set signal is asserted.

10. The method of claim 9 further comprising the step of:

asserting a mode signal when the buffered pulse width modulation function is to be executed.

11. The method of claim 10 wherein the mode signal is accessed from a timing register.

12. The method of claim 9 wherein the modulo value indicates a period of the output pulse signal.

13. The method of claim 9 wherein a second timer channel performs a general purpose input/output function when the buffered pulse width modulation function is executed.

14. A data processor having for performing a buffered pulse width modulation function, comprising:

a decoder for selectively generating a first write channel signal and a second write channel signal;

a counter for generating a count value;

a first storage register for selectively storing a first pulse width value when the first write channel signal is a first value, the first storage register being coupled to the decoder for receiving the first write channel signal;

a first comparator for comparing the count value with the first pulse width value, the first comparator asserting a first comparison signal when the count value is the same as the first pulse width value, the first comparator having a first input coupled to the counter for receiving the count value, the first comparator having a second input coupled to the first storage register for receiving the first pulse width value;

a second storage register for selectively storing a second pulse width value when the second write channel signal is a second value, the second storage register being coupled to the decoder for receiving the second write channel signal;

a second comparator for comparing the count value with the second pulse width value, the second comparator asserting a second comparison signal when the count value is the same as the second pulse width value, the second comparator having a first input coupled to the counter for receiving the count value, the second comparator having a second input coupled to the second storage register for receiving the second pulse width value;

a select circuit for selecting an output pulse width value, the select signal selecting the first comparison signal as the output pulse width value when the first write channel signal is the first logic value and the select signal selecting the second comparison signal as the output pulse width value when the second write channel signal is the second logic value, the select circuit having a first input coupled to the first comparator for receiving the first comparison value, a second input coupled to the second comparator for receiving the second comparison value, a third input coupled to the decoder for receiving the first write channel signal, and a fourth input coupled to the decoder for receiving the second write channel signal, wherein the first write channel signal is the first logic value when the first pulse width value is stored in the first storage means and the second write channel signal is the second logic value when the second pulse width value is stored in the second storage means; and an output circuit for providing a pulse having an output pulse width determined by the output pulse width value, the output circuit being coupled to the select circuit for receiving the output pulse value.

15. A data processor for executing a buffered pulse width modulation function, comprising:

a decoder decoding an address value to selectively generate one of a first write channel signal and a second write channel signal a counter for generating a counter value;

a modulo register for storing a modulo value, the modulo register being coupled to the counter for receiving the counter value;

a first register for selectively storing a first pulse width value when the first write channel signal is in a first logic state, the first register being coupled to the decoder for receiving the first write channel signal;

a second register for storing a second pulse width value when the second write channel signal is in a second logic state, the second register being coupled to the decoder for receiving the first write channel signal;

a first comparator coupled to the counter for receiving the counter value, the first comparator asserting a first compare signal when the first pulse width value is the same as the counter value and the first compare signal remaining negated when the first compare value is the value other than the counter value;

a second comparator coupled to the counter for receiving the counter value, the second comparator asserting a second compare signal when the second pulse width value is the same as the counter value and the second compare signal remaining negated when the second compare value is the value other than the counter value;

an overflow detector coupled to the modulo register, the overflow detector asserting an overflow signal when the modulo value is the same as the counter value and the overflow signal remaining negated when the overflow value is the value other than the counter value;

a select control circuit coupled to the overflow detector for receiving the overflow signal, coupled to the first comparator for receiving the first compare signal, and coupled to the second comparator for receiving the second compare signal, the select control circuit selectively providing one of the first compare signal and the second compare signal as a pulse set signal, wherein:

the select control circuit provides the first compare signal as the pulse set signal when the overflow signal is asserted and the first write channel is asserted, and the select control circuit provides the second compare signal as the pulse set when the overflow signal is asserted and the second write channel signal is asserted;

an integrated circuit pin associated with the first timer channel to assert an output pulse signal when the overflow signal is asserted; and enabling the integrated circuit pin associated with the first timer channel to negate the output pulse signal when the pulse set signal is asserted.

* * * * *